(12) United States Patent
Wang et al.

(10) Patent No.: US 11,225,611 B1
(45) Date of Patent: Jan. 18, 2022

(54) ONLINE ANALYZER FOR BIOFUEL PRODUCTION

(71) Applicant: ExxonMobil Research and Engineering Company, Annandale, NJ (US)

(72) Inventors: Chengrong Wang, Easton, PA (US); Anding Zhang, Short Hills, NJ (US); Xiaochun Xu, Basking Ridge, NJ (US); Samuel J. Cady, Morristown, NJ (US); Shifang Luo, Annandale, NJ (US); Michael H. Ring, Conroe, TX (US); Maria Vanessa C. Aguinaldo, Katy, TX (US); John Della Mora, North York (CA); Kegun L. Ream, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/946,823

(22) Filed: Jul. 8, 2020

(51) Int. Cl.
*C10L 1/04* (2006.01)
*C10G 3/00* (2006.01)
*G01J 3/28* (2006.01)

(52) U.S. Cl.
CPC ............... *C10G 3/50* (2013.01); *C10L 1/04* (2013.01); *G01J 3/2823* (2013.01); *C10G 2300/1011* (2013.01); *C10L 2200/0476* (2013.01)

(58) Field of Classification Search
CPC ..... C10G 3/50; C10G 2300/1011; C10L 1/04; C10L 2200/0476; G01J 3/2823
See application file for complete search history.

(56) References Cited

U.S. PATENT DOCUMENTS

| 8,586,365 | B2 | 11/2013 | Wells et al. | |
|---|---|---|---|---|
| 8,674,160 | B2 | 3/2014 | Hanks et al. | |
| 2011/0138679 | A1* | 6/2011 | Wells | C10L 1/02 44/307 |
| 2011/0219671 | A1* | 9/2011 | Hanks | C10L 1/08 44/307 |

* cited by examiner

*Primary Examiner* — Ellen M McAvoy
*Assistant Examiner* — Chantel L Graham
(74) *Attorney, Agent, or Firm* — Kristina Okafor

(57) ABSTRACT

Disclose is an online analyzer to monitor conversion of a biofeedstock in a first hydrotreating stage to avoid catalyst poisoning in a subsequent stage. An example method of processing a biofeedstock may comprise hydrotreating the biofeedstock by reaction with hydrogen to form a hydrotreated biofeedstock. The method may further comprise monitoring conversion of the biofeedstock in the hydrotreating with an online analyzer.

20 Claims, 11 Drawing Sheets

ONLINE ANALYZER FOR BIOFUEL PRODUCTION

FIELD OF THE INVENTION

This application relates to renewable diesel production and, in particular, embodiments relate to utilization of an online analyzer to monitor conversion of a biofeedstock in a first hydrotreating stage to avoid catalyst poisoning in a subsequent stage.

BACKGROUND OF THE INVENTION

Renewable diesel is a hydrocarbon fuel made from vegetable oils, fats, greases, or other suitable biofeedstocks. In contrast to biodiesels, renewable diesels are not esters and are chemically similar to petroleum diesels. In some instances, renewable diesel can be used as a blendstock for blending with petroleum diesel. While a number of different techniques can be used for renewable diesel production, an example process includes hydrotreatment of a biofeedstock followed by dewaxing. Since the dewaxing catalyst can be sensitive to oxygen, the activity of dewaxing catalyst can be quickly inhibited or deactivated should the oxygen in the biofeedstock not be sufficiently converting in the hydrotreatment.

SUMMARY OF THE INVENTION

Disclosed herein is an example method of processing a biofeedstock. The method may comprise hydrotreating the biofeedstock by reaction with hydrogen to form a hydrotreated biofeedstock. The method may further comprise monitoring conversion of the biofeedstock in the hydrotreating with an online analyzer.

Disclosed herein a system for production of renewable diesel. The system may comprise a hydrotreatment stage comprising a hydrodeoxygenation reactor that receives a biofeedstock. The system may further comprise a dewaxing stage comprising a dewaxing reactor that receives a hydrotreated product stream from the hydrotreatment stage. The system may further comprise an online analyzer positioned to analyze the hydrotreated product stream to monitor conversion of the biofeedstock in the hydrotreatment stage.

BRIEF DESCRIPTION OF THE DRAWINGS

These drawings illustrate certain aspects of the present disclosure and should not be used to limit or define the invention.

DETAILED DESCRIPTION

Figure 1:
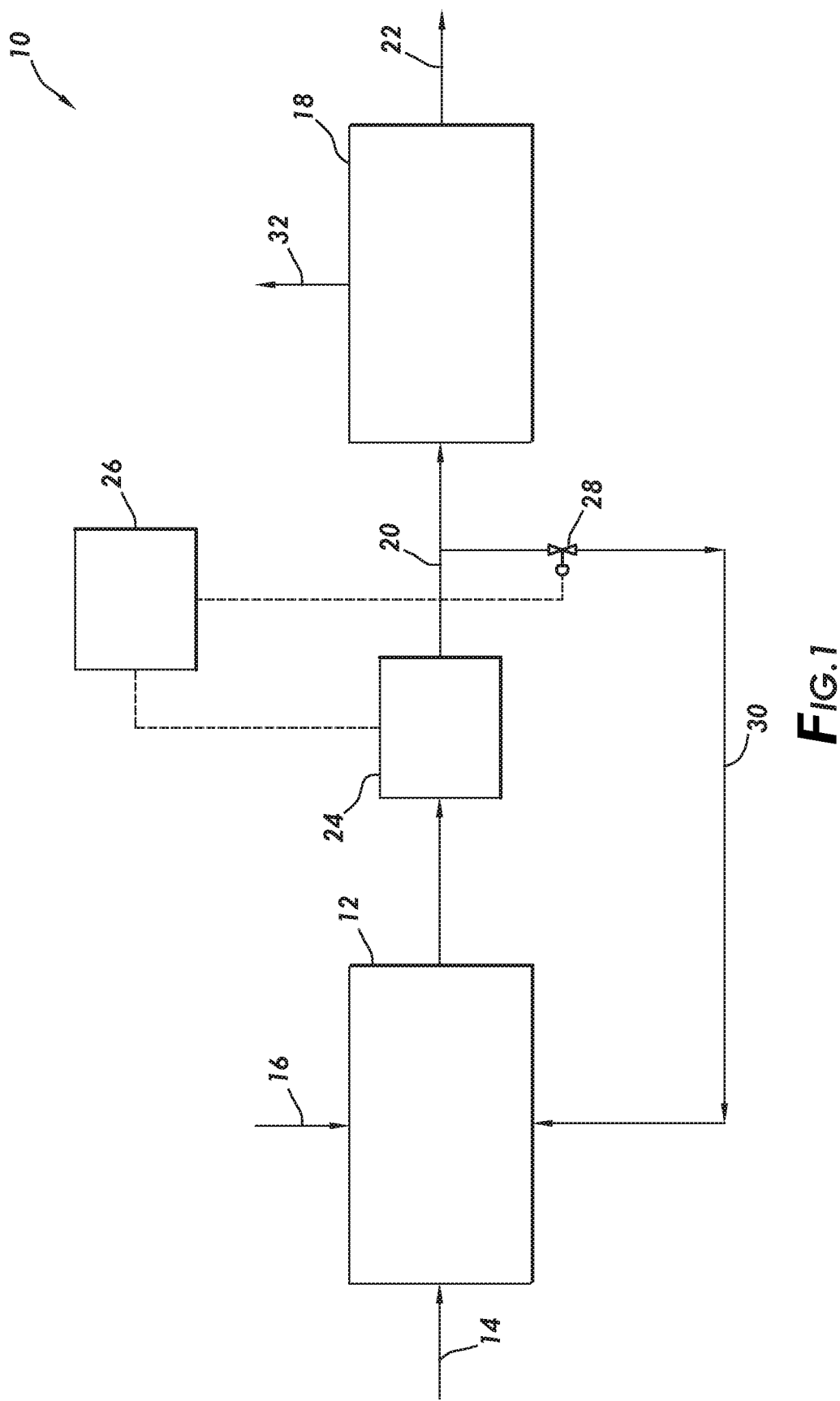
FIG. 1 depicts an example renewable diesel production system in accordance with one or more embodiments.

This application relates to renewable diesel production and, in particular, embodiments, relates to utilization of an online analyzer to monitor conversion of a biofeedstock in a hydrotreating stage to avoid catalyst poisoning in a subsequent dewaxing stage. While a variety of online analyzers may be suitable, online spectrometers may be particularly suitable, in certain embodiments, for monitoring concentration change of raw materials of the biofeedstock in the hydrotreating stage.

In accordance with present embodiments, renewable diesel production may include a hydrotreating stage. In the hydrotreating stage, a biofeedstock may be converted by reaction with hydrogen to form, for example, paraffin products with removal of oxygen. Particular embodiments for renewable diesel production may further include a dewaxing stage that receives hydrotreated biofeedstock from the hydrotreating stage. In the dewaxing stage, the hydrotreated biofeedstock may be catalytically dewaxed, for example, by removal and/or isomerization of long chain paraffinic molecules, such as molecules ranging from 12 carbons long to 24 carbons long or from 16 carbons long to 22 carbons long. However, catalysts used in the dewaxing stage may be sensitive to oxygen. Accordingly, if there is insufficient feed conversion in the hydrotreating stage, the catalyst in the dewaxing stage may deactivate too quickly.

To monitor conversion of the biofeedstock in the hydrotreating stage and avoid potential catalyst poisoning in the dewaxing stage, example embodiments use an online analyzer, such as a spectrometer. In some embodiments, the online analyzer may be positioned between the hydrotreating stage and the dewaxing stage. The online analyzer may monitor concentration change of the biofeedstock to determine whether sufficient oxygen has been removed from the biofeedstock before sending the hydrotreated biofeedstock to the dewaxing stage. In some embodiments, the systems and methods may utilize the online analyzer to measure carbonyl group concentration in the reaction products from the hydrotreating stage. The use of an online analyzer can provide several advantages over traditional techniques that use offline analysis where a sample from the hydrotreating stage is taken to a lab for analysis. By way example, the online analyzer monitors the hydrotreating stage in real time with minimal personnel involvement by process operators. With real time monitoring, process changes may be implemented to prevent insufficiently converted biofeedstock with too high oxygen content from poisoning the downstream dewaxing catalyst. In some embodiments, the hydrotreated biofeedstock can be recycled to the hydrotreating stage if the online analysis indicates insufficient conversion.

Embodiments may include a process for renewable diesel production. Renewable diesel is a hydrocarbon made from biofeedstocks, including vegetable oils, fats, greases, or other sources of triglycerides, which can include various crops, waste oil, or other animal fats. As used herein, the term "renewable diesel" refers to a hydrocarbon liquid produced from a biofeedstock and with paraffins as a major component. Because renewable diesel is chemically similar to petroleum diesel, renewable diesel is capable of use in diesel engines without engine modification. In one example, a renewable diesel includes between about 50% to about 99% by weight of paraffins. A 100% renewable diesel should meet the ASTM D975 specification for diesel fuel.

In accordance with present embodiments, the renewable diesel may be produced from a biofeedstock. Any of a variety of suitable biofeedstocks may be used in the production of the renewable diesel. The biofeedstock may be derived from a biological raw material component such as vegetable, animal, fish, and/or algae. Suitable biofeedstocks may include, but are not limited to, vegetable oils, animal fats, fish oils, pyrolysis oils, and algae lipids/oils, as well as components of such materials, and in some embodiments can specifically include one or more type of lipid compounds. As used herein, vegetable fats/oils refer to any plant-based material and can include fat/oils derived from a source such as plants of the genus Jatropha. In some embodiments, the biofeedstock may include biodiesel, also referred to as fatty acid methyl ester. In some embodiments, the biofeedstock may include free fatty acids.

The biofeedstock may include lipid compounds, which are typically biological compounds that are insoluble in water, but soluble in nonpolar (or fat) solvents. Non-limiting examples of such solvents include alcohols, ethers, chloroform, alkyl acetates, benzene, and combinations thereof. Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

The biofeedstock may include vegetable oils. Examples of vegetable oils that can be used may include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil. Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. In some embodiments, one or more of methyl, ethyl, and propyl esters may be used.

The biofeedstock may include animal fats. Examples of animal fats that can be used include, but are not limited to, beef fat (tallow), hog fat (lard), turkey fat, fish fat/oil, and chicken fat. The animal fats can be obtained from any suitable source including restaurants and meat production facilities. Animal fats as referred to herein also include processed animal fat material. Non-limiting examples of processed animal fat material include fatty acids and fatty acid alkyl esters. Alkyl esters typically include $C_1$-$C_5$ alkyl esters. In some embodiments, one or more of methyl, ethyl, and propyl esters may be used.

The biofeedstock may include algae oils or lipids that may be typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 weight percent ("wt. %") to 40 wt. % of lipids, based on total weight of the biomass itself. Algal sources for algae oils may include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

The biofeedstock may include feedstocks that primarily include triglycerides and free fatty acids (FFAs). The triglycerides and FFAs typically contain aliphatic hydrocarbon chains in their structure having from 8 to 36 carbons, for example, from 10 to 26 carbons or 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can include $C_{10}$ to $C_{26}$ fatty acid constituents, based on total triglyceride present in the lipid material. Further, a triglyceride is a molecule having a structure substantially identical to the reaction product of glycerol and three fatty acids. Thus, although a triglyceride is described herein as being including fatty acids, it should be understood that the fatty acid component does not necessarily contain a carboxylic acid hydrogen. In one embodiment, a majority of triglycerides present in the biocomponent feed can include $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

FIG. 1 is a simplified block diagram illustrating a system 10 for renewable diesel production in accordance with some embodiments. As illustrated, the system 10 may include the following stages: (i) a hydrotreating stage 12 in which a biofeed stream 14 containing a biofeedstock can be reacted with hydrogen from a hydrogen stream 16 to remove oxygen from the biofeedstock; and (ii) a dewaxing stage 18 that receives a hydrotreated product stream 20 containing hydrotreated biofeedstock and catalytically dewaxes the hydrotreated biofeedstock to produce a renewable diesel product 22 with improved cold flow properties. As illustrated, an online analyzer 24 may analyze hydrotreated biofeedstock to monitor conversion of the biofeedstock in the hydrotreating stage 12 to products with reduced oxygen content. By way example, the online analyzer 24 can measure concentration of certain groups (e.g., carbonyl groups) in the hydrotreated biofeedstock, which indicates presence of the biofeedstock or intermediate products. Should there be insufficient conversion, then oxygen has not been sufficiently removed which can undesirably interact with the catalyst in the dewaxing stage 18. Should the oxygen not be sufficiently removed at least a portion of the hydrotreated biofeedstock can be recycled to the hydrotreating stage 12 for further reaction. As illustrated, a controller 26 may operate a recycle valve 28 to control recycle of the hydrotreated biofeedstock.

In the hydrotreating stage 12, the biofeed stream 14 containing a biofeedstock may be combined with the hydrogen stream 16 containing hydrogen. While FIG. 1 illustrates separate addition of the biofeed stream 14 and the hydrogen stream 16 to the hydrotreating stage 12, embodiments may include combination of the biofeed stream 14 and the hydrogen stream 16 prior to the hydrotreating stage 12. The hydrotreating stage 12 should remove oxygen from the biofeedstock in the biofeed stream 14 by reaction with hydrogen in the hydrogen stream 16. The reaction in the hydrotreating stage 12 should produce hydrotreated biofeedstock, including paraffin products, reaction intermediates, and unreacted biofeedstock and hydrogen. Reaction intermediates may include esters, acids, and ketones, alcohols, among others.

In some embodiments, the hydrotreating stage 12 may include a hydrotreatment catalyst. Examples of suitable hydrotreatment catalyst may contain at least one of Group VIB and/or Group VIII metals, optionally on a support such as alumina or silica. Examples can include, but are not limited to, NiMo, CoMo, and NiW supported catalysts. The hydrotreating stage 12 can be operated at any suitable conditions that are effective for hydrotreatment. Effective hydrotreatment conditions may include, but are not limited to, a temperature of about 500° F. (about 260° C.) or higher, for example, about 550° F. (about 288° C.) or higher, about 600° F. (about 316° C.) or higher, or about 650° F. (about 343° C.) or higher. Additionally, or alternately, the temperature can be about 750° F. (about 399° C.) or less, for example about 700° F. (about 371° C.) or less, or about 650° F. (about 343° C.) or less. Effective hydrotreatment conditions can additionally or alternately include, but are not limited to, a total pressure of about 400 psig (about 2.8 MPag) or more, for example, about 500 psig (about 3.4 MPag) or more, about 750 psig (about 5.2 MPag) or more, or about 1000 psig (about 6.9 MPag) or more. Additionally or alternately, the total pressure can be about 2000 psig (about 10.3 MPag) or less, for example about 1200 psig (about 8.2 MPag) or less, about 1000 psig (about 6.9 MPag) or less, or about 800 psig (about 5.5 MPag) or less. In some embodiments, the hydrotreating conditions can include, but are not necessarily limited to, a temperature of about 315° C. to about 425° C. and a total pressure of about 300 psig (about 2.1 MPag) to about 3000 psig (about 21 MPag).

While not shown on FIG. 1, a separation device (e.g., hydrotreating separator 36 on FIG. 2) can be used to separate out light streams (e.g., hydrogen) prior to passing the hydrotreated biofeedstock to the dewaxing stage 18. The separation device can be a separator, a stripper, a fractionator, or another device suitable for separating gas-phase products from liquid-phase products. For instance, a separation device can be used to remove unreacted hydrogen and/or at least a portion of any $H_2S$ and/or $NH_3$ formed during hydrotreatment, e.g., with the remainder of the $H_2S$ and/or $NH_3$ formed during hydrotreatment being cascaded to the dewaxing stage 18, as desired. Alternately, the entire effluent from the hydrotreatment stage 12 can be cascaded to the dew axing stage 18, if desired.

As previously described, the hydrotreatment stage 12 should at least partially deoxygenate the biofeedstock in the biofeed stream 14. Deoxygenating the biofeedstock can avoid problems with catalyst poisoning or deactivation due to the creation of water or carbon oxides during the subsequent catalytic dewaxing in the dewaxing stage 18. The hydrotreatment stage 12 can be used to substantially deoxygenate the biofeedstock. This corresponds to removing about 90% or more, for example, about 95% or more, about 98% or more, about 99% or more, about 99.5% or more, about 99.9% or, or completely (measurably) all the oxygen present in the biofeedstock. Alternately, substantially deoxygenating the biofeedstock can correspond to reducing the oxygenate level of the hydrotreated biofeedstock to about 0.1 wt. % or less, for example, about 0.05 wt. % or less, about 0.03 wt. % or less, about 0.02 wt. % or less, about 0.01 wt. % or less, about 0.005 wt. % or less, about 0.003 wt. % or less, about 0.002 wt. % or less, or about 0.001 wt. % or less.

The system 10 may include the online analyzer 24 to prevent inadequately deoxygenated biofeedstock from being passed to the dewaxing stage 18, in accordance with present embodiments. The online analyzer 24 may be positioned to analyze the hydrotreated biofeedstock from the hydrotreatment stage 12. The online analyzer 24 may be positioned at any suitable location for monitoring the hydrotreated biofeedstock. As illustrated, the online analyzer 24 may be positioned between the hydrotreatment stage 12 and the dewaxing stage 18. In some embodiments, the online analyzer 24 may be positioned to measure the effluent from a hydrodeoxygenation reactor (e.g., hydrodeoxygenation reactor 34 on FIG. 2). In some embodiments, the online analyzer 24 may be positioned to measure the liquid-phase products from a separation device (e.g., hydrogenation separator 36 on FIG. 2) in the hydrotreatment stage 12. The online analyzer 24 may analyze all or a portion of the hydrotreated products. For example, the online analyzer 24 may measure a slipstream (not shown) of the hydrotreated product stream 20. Should the measurements from the online analyzer indicate there has been insufficient conversion, the hydrotreated biofeedstock can be recycled to the hydrotreating stage 12 for further reaction. If there is insufficient conversion of the hydrotreated biofeedstock, the hydrotreated biofeedstock would contain too much oxygen in either unreacted biofeedstock or intermediates, thus potentially prematurely deactivating the catalyst in the dewaxing stage 18.

Examples of suitable analyzers that can be used for the online analyzer 24 include, but are not limited to, infrared spectrometers, near infrared spectrometers, and Raman spectrometers. Infrared spectrometers typically involve interaction of infrared radiation with matter to produce an infrared spectrum. The infrared spectrum can be visualized as a graph of light absorbance (or transmittance) on the vertical (y-axis) versus frequency (or wavelength) on the horizontal (x-axis). Units of frequency may be reported in reciprocal centimeters ($cm^{-1}$). Units of wavelength may be reported in micrometers. Near infrared spectrometers utilize the near infrared region, generally from 780 nm to 2500 nm. Similar to infrared spectrometers, the infrared spectrums from near infrared spectrometers can also be visualized as a graph of light absorbance (or transmittance) on the vertical (y-axis) versus frequency (or wavelength) on the horizontal (x-axis). In infrared spectra, each peak generally corresponds to a different functional group, such as C=O, O—H, among others. Raman spectrometers utilize a spectroscopic technique that uses light scattering to determine vibrational modes of molecules and produce a Raman spectrum. The Raman spectrum can be visualized a graph showing the intensity and wavelength position of the scattered light. In Raman spectra, each peak generally corresponds to different molecular bonds, such as C—C, N—O, C=O, among others.

Measurements from the online analyzer 24 may be correlated with conversion of the biofeedstock. For example, the online analyzer 24 can measure concentration of certain groups (e.g., carbonyl groups (C=O)) in the hydrotreated biofeedstock, which indicates presence of the biofeedstock or intermediate products. For example, the peak intensity at the characteristic group peak may be monitored, thus providing an indication (indirect measurement) of the oxygen content in the hydrotreated biofeedstock. The concentration of the carbonyl groups may be represented in the measurements of the online analyzer 24 by peak intensity. For example, the carbonyl peak on an infrared spectrum can be at 1745 (+/−10) cm$^{-1}$. This peak at approximately 1745 cm$^{-1}$ has been confirmed to be the carbonyl peak in the biofeedstock (or intermediates) through a secondary analytical technique, gas chromatograph-mass spectrometry. Because this peak on the infrared spectrum correlates to the carbonyl peak, this peak at approximately 1745 cm$^{-1}$ can detect trace amounts of the carbonyl group in the hydrotreated biofeedstock to indicate insufficient conversion.

As illustrated, a controller 26 may operate a recycle valve 28 to control recycle of the hydrotreated biofeedstock. For example, the recycle valve 28 may be used to direct the hydrotreated biofeedstock through recycle line 30 instead of to the dewaxing stage 18. The controller 26 may include any suitable device for processing instructions, including, but not limited to, a microprocessor, microcontroller, embedded microcontroller, programmable digital signal processor, or other programmable device. The controller 26 may also, or instead, be embodied in an application specific integrated circuit, a programmable gate array, programmable array logic, or any other device or combinations of devices operable to process electric signals. The controller 26 can be configured to receive inputs from the online analyzer 24 and to send control signals to the recycle valve 28. The controller 26 may also send control signals to the online analyzer 24. A set intensity value may be input and/or otherwise stored in the controller 26. The set intensity value could be a value that if exceeded would indicate insufficient conversion in that the measurements of the hydrotreated biofeedstock would include too much unconverted biofeedstock and intermediates with oxygen. In some embodiments, the controller 26 may compare the measured intensity value from the online analyzer 24 at the peak of interest (e.g., carbonyl peak such as approximately 1745 cm$^{-1}$ on an infrared spectrum) to the set intensity value. If the measured intensity value exceeds the set intensity value, it would indicate insufficient conversion with the controller 26 directing the hydrotreated biofeedstock through the recycle valve 28 back to the hydrotreating stage 12. However, if the measured intensity value is equal to or less than the set intensity value, it would indicate sufficient conversion with the hydrotreated biofeedstock being sent to the dewaxing stage 18. It should be understood that the above description is merely an example of one methodology for operation of the online analyzer 24, for example, with the controller 26.

In the dewaxing stage 18, at least a portion of the hydrotreated biofeedstock in the hydrotreated product stream 20 may be catalytically dewaxed to produce a renewable diesel product stream 22 with improved its cold flow properties, such as pour point and/or cloud point. Catalytic dewaxing relates to the removal and/or isomerization of long chain paraffinic molecules from the hydrotreated biofeedstock. Catalytic dewaxing may be accomplished by selective hydrocracking or by hydroisomerization of these long chain molecules. In addition to renewable diesel product stream 22, dewaxing gas stream 32 may also exit the dewaxing stage 18. The dewaxing gas stream 32 may contain hydrogen and other gases generated in the dewaxing stage 18.

The dewaxing stage 18 can include a dewaxing catalyst. As previously described, the dewaxing catalyst can be sensitive to oxygen so example embodiments include monitoring the hydrotreated biofeedstock with the online analyzer 24 so that the hydrotreated biofeedstock can be recycled to the hydrotreating stage 12 if too much oxygen is present. In some embodiments, the dewaxing catalyst can include molecular sieves such as crystalline aluminosilicates (zeolites) and/or silicoaluminophosphates (SAPOs). For example, the molecular sieve can be a 1-D or 3-D molecular sieve. By way of further example, the molecular sieve can be a 10-member ring 1-D molecular sieve (e.g., ZSM-48). Examples of molecular sieves can include, but are not limited to, ZSM-48, ZSM-23, ZSM-35, Beta, USY, ZSM-5, and combinations thereof. In an embodiment, the molecular sieve can include or be ZSM-48, ZSM-23, or a combination thereof. The dewaxing catalyst can optionally include a binder, such as alumina, titania, silica, silica-alumina, zirconia, or a combination thereof. In an embodiment, the binder can include or be alumina, titania, or a combination thereof. In another embodiment, the binder can include or be titania, silica, zirconia, or a combination thereof.

The dewaxing catalyst can also include a metal hydrogenation component, such as a Group VIII metal. Suitable Group VIII metals can include, but are not limited to, Pt, Pd, Ni, and combinations thereof. The dewaxing catalyst can advantageously include about 0.1 wt. % or more of the Group VIII metal, for example, about 0.3 wt. % or more, about 0.5 wt. % or more, about 1.0 wt. % or more, about 2.0 wt. % or more, about 2.5 wt. % or more, about 3.0 wt. % or more, or about 5.0 wt. % or more. Additionally or alternately, the dewaxing catalyst can include about 10.0 wt. % or less of a Group VIII metal, for example about 7.0 wt. % or less, about 5.0 wt. % or less, about 3.0 wt. % or less, about 2.5 wt. % or less, about 2.0 wt. % or less, or about 1.5 wt. % or less.

In some embodiments, particularly when Group VIII metal is a non-noble metal such as Ni, the dewaxing catalyst may additionally include a Group VIB metal, such as W and/or Mo. For instance, in one embodiment, the dewaxing catalyst can include Ni and W, Ni and Mo, or a combination of Ni, Mo, and W. In certain such embodiments, the dewaxing catalyst can include about 0.5 wt. % or more of the Group VIB metal, for example, about 1.0 wt. % or more, about 2.0 wt. % or more, about 2.5 wt. % or more, about 3.0 wt. % or more, about 4.0 wt. % or more, or about 5.0 wt. % or more. Additionally or alternately, the dewaxing catalyst can include about 20.0 wt. % or less of a Group VIB metal, for example about 15.0 wt. % or less, about 12.0 wt. % or less, about 10.0 wt. % or less, about 8.0 wt. % or less, about 5.0 wt. % or less, about 3.0 wt. % or less, or about 1.0 wt. % or less. In one particular embodiment, the dewaxing catalyst can include only a Group VIII metal selected from Pt, Pd, and a combination thereof.

Catalytic dewaxing can be performed by exposing the hydrotreated biofeedstock to a dewaxing catalyst (that may, and usually does, also have isomerization activity) under effective (catalytic) dewaxing (and/or isomerization) conditions. Effective dewaxing conditions can include, but are not limited to, a temperature of about 500° F. (about 260° C.) or higher, for example, bout 550° F. (about 288° C.) or higher, about 600° F. (about 316° C.) or higher, or about 650° F. (about 343° C.) or higher. Additionally, or alternately, the temperature can be about 750° F. (about 399° C.) or less, for example about 700° F. (about 371° C.) or less, or about 650° F. (about 343° C.) or less. Effective dewaxing conditions can additionally or alternately include, but are not limited to, a total pressure of about 200 psig (about 1.4 MPag) or more, for example, about 250 psig (1.7 Mpag) or more, about 500 psig (about 3.4 MPag) or more, about 750 psig (about 5.2 MPag) or more, or about 1000 psig (about 6.9 MPag) or more. Additionally or alternately, the total pressure can be about 1500 psig (about 10.3 MPag) or less, for example about 1200 psig (about 8.2 MPag) or less, about 1000 psig (about 6.9 MPag) or less, or about 800 psig (about 5.5 MPag) or less.

Figure 2:
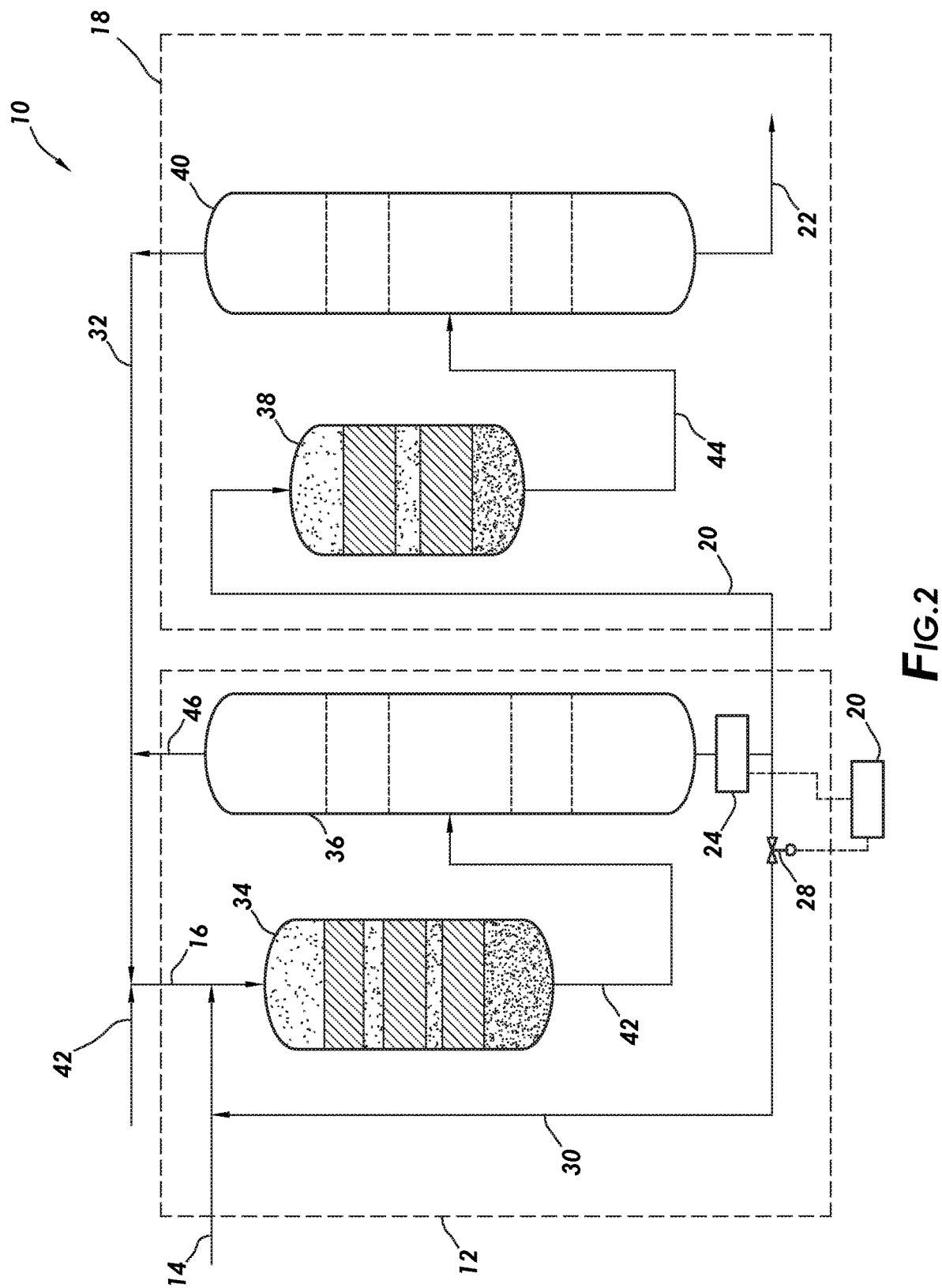
FIG. 2 depicts another example renewable diesel production system in accordance with one or more embodiments.

FIG. 2 illustrates an example of the system 10 for renewable diesel production in accordance with some embodiments. As illustrated, the system 10 may include the hydrotreating stage 12 and the dewaxing stage 18. The hydrotreating stage 12 may include a hydrodeoxygenation reactor 34 and a hydrotreating separator 36. The dewaxing stage 18 may include a dewaxing reactor 38 and a dewaxing separator 40. The online analyzer 24 may be positioned between the hydrotreating separator 36 and the dewaxing reactor 38.

In operation, a biofeedstock stream 14 and a hydrogen stream 16 may be introduced into the hydrotreating stage 16. As illustrated, the biofeedstock stream 14 and the hydrogen stream 16 can be combined and introduced into the hydrodeoxygenation reactor 34. However, it should be understood that these streams may alternatively be separately introduced to the hydrodeoxygenation reactor 34. The hydrotreatment in the hydrodeoxygenation reactor 34 is discussed in the preceding sections. As illustrated, the hydrodeoxygenation reactor effluent stream 42 may flow from the hydrodeoxygenation reactor 34 into a hydrogenation separator 36 for separation of the gas-phase products from the liquid-phase products. The liquid-phase products may be withdrawn from the hydrogenation separator 36 as hydrotreated product stream 20. The gas-phase products may be withdrawn from the hydrogenation separator 36 as hydrotreated gas recycle stream 46. As illustrated, the hydrotreated gas recycle stream 46 may be combined with the dewaxing gas stream 32 from the dewaxing separator 40 to form the hydrogen stream 16 fed to the hydrodeoxygenation reactor 34. Makeup hydrogen stream 42 may also be combined into the hydrogen stream 16 as needed.

The hydrotreated product stream 20 can be introduced into the dewaxing stage 18. As illustrated, the hydrotreated product stream 20 may be introduced into dewaxing reactor 38. The dewaxing that occurs in the dewaxing reactor 38 is discussed in the preceding sections. The dewaxing reactor effluent 44 may be introduced into a dewaxing separator 40 for separation of the gas-phase products from the liquid-phase products. The gas-phase products may be withdrawn from the dewaxing separator 40 as dewaxing gas stream 32 and combined with the hydrotreated gas recycle stream 46 for recycle to the hydrodeoxygenation reactor 34. The liquid-phase products may be withdrawn from the dewaxing separator 40 as renewable diesel product 22.

Accordingly, the preceding description describes utilization of an online analyzer to monitor conversion of the biofeedstock in a first hydrotreating stage to avoid catalyst poisoning in a subsequent stage. The apparatus, systems, and methods disclosed herein may include any of the various features disclosed herein, including one or more of the following embodiments.

Embodiment 1. A method of processing a biofeedstock, comprising: hydrotreating the biofeedstock by reaction with hydrogen to form a hydrotreated biofeedstock; and monitoring conversion of the biofeedstock in the hydrotreating with an online analyzer.

Embodiment 2. The method of embodiment 1, wherein the biofeedstock comprises at one component selected from the group consisting of a vegetable oil, an animal fat, a fish oil, a pyrolysis oil, algae lipid, an algae oil, and combinations thereof.

Embodiment 3. The method of embodiment 1 or 2, wherein the biofeedstock comprises lipid compounds.

Embodiment 4. The method of any preceding embodiment, wherein the hydrotreated biofeedstock comprises paraffin products.

Embodiment 5. The method of any preceding embodiment, wherein the online analyzer comprises a spectrometer.

Embodiment 6. The method of any preceding embodiment, wherein the online analyzer is an infrared spectrometer, a near infrared spectrometer, or a Raman spectrometer.

Embodiment 7. The method of any preceding embodiment, wherein the monitoring conversion of the biofeedstock comprises determining oxygen removal from the biofeedstock.

Embodiment 8. The method of any preceding embodiment, wherein the monitoring conversion comprises correlating measurements from the online analyzer with conversion of the biofeedstock.

Embodiment 9. The method of any preceding embodiment, wherein the monitoring conversion comprises measuring carbonyl group concentration in the hydrotreated biofeedstock.

Embodiment 10. The method of any preceding embodiment, wherein the online analyzer is positioned between a hydrodeoxygenation reactor and a dewaxing reactor.

Embodiment 11. The method of any preceding embodiment, further comprising contacting at least a portion of the hydrotreated biofeedstock with a dewaxing catalyst to produce a renewable diesel product.

Embodiment 12. The method of claim 11, further comprising separating gas-phase products from the hydrotreated biofeedstock before the contacting at least the portion of the hydrotreated biofeedstock.

Embodiment 13. The method of any preceding embodiment, further comprising recycling the hydrotreated biofeedstock to the hydrotreating until the monitoring conversion indicates that about 90 wt. % or more of oxygen is removed from the biofeedstock.

Embodiment 14. The method of any preceding embodiment, further comprising recycling the hydrotreated biofeedstock to the hydrotreating until the monitoring conversion indicates that about 99 wt. % or more of oxygen is removed from the biofeedstock.

Embodiment 15. The method of any preceding embodiment, further comprising recycling the hydrotreated biofeedstock until a peak intensity for a carbonyl peak on an infrared spectrum from the online analyzer is below a set intensity value.

Embodiment 16. A system for production of renewable diesel comprising: a hydrotreatment stage comprising a hydrodeoxygenation reactor that receives a biofeedstock; a dewaxing stage comprising a dewaxing reactor that receives a hydrotreated product stream from the hydrotreatment stage; and an online analyzer positioned to analyze the hydrotreated product stream to monitor conversion of the biofeedstock in the hydrotreatment stage.

Embodiment 17. The system of embodiment 16, wherein the online analyzer is an infrared spectrometer, a near infrared spectrometer, or a Raman spectrometer.

Embodiment 18. The system of embodiment 16 or 17, further comprising a controller that controls recycles of the hydrotreated product stream in response to measurements from the online analyzer.

Embodiment 19. The system of claim 18, further comprising a recycle valve, wherein the controller is configured to send control signals to the recycle valve in response to the measurements from the online analyzer.

Embodiment 20. The system of any one of claims 16 to 19, wherein the online analyzer is positioned between the hydrodeoxygenation reactor and the dewaxing reactor.

To facilitate a better understanding of the embodiments described herein, the following examples of certain aspects of some embodiments are given. In no way should the following examples be read to limit, or define, the scope of the present disclosure.

EXAMPLES

To illustrate the use of an online analyzer in monitoring conversion of a biofeedstock in a hydrotreatment the following example was performed. The biofeedstock used in this example was canola oil. The canola oil was reacted with hydrogen over a hydrotreatment catalyst at conditions effective to produce hydrotreatment products, such as paraffin products. The reaction products were then tested periodically at various stages of reaction to evaluate conversion. The reaction products were tested with an infrared spectrometer and also with a gas chromatograph mass spectrometer (GCMS).

Figure 3:
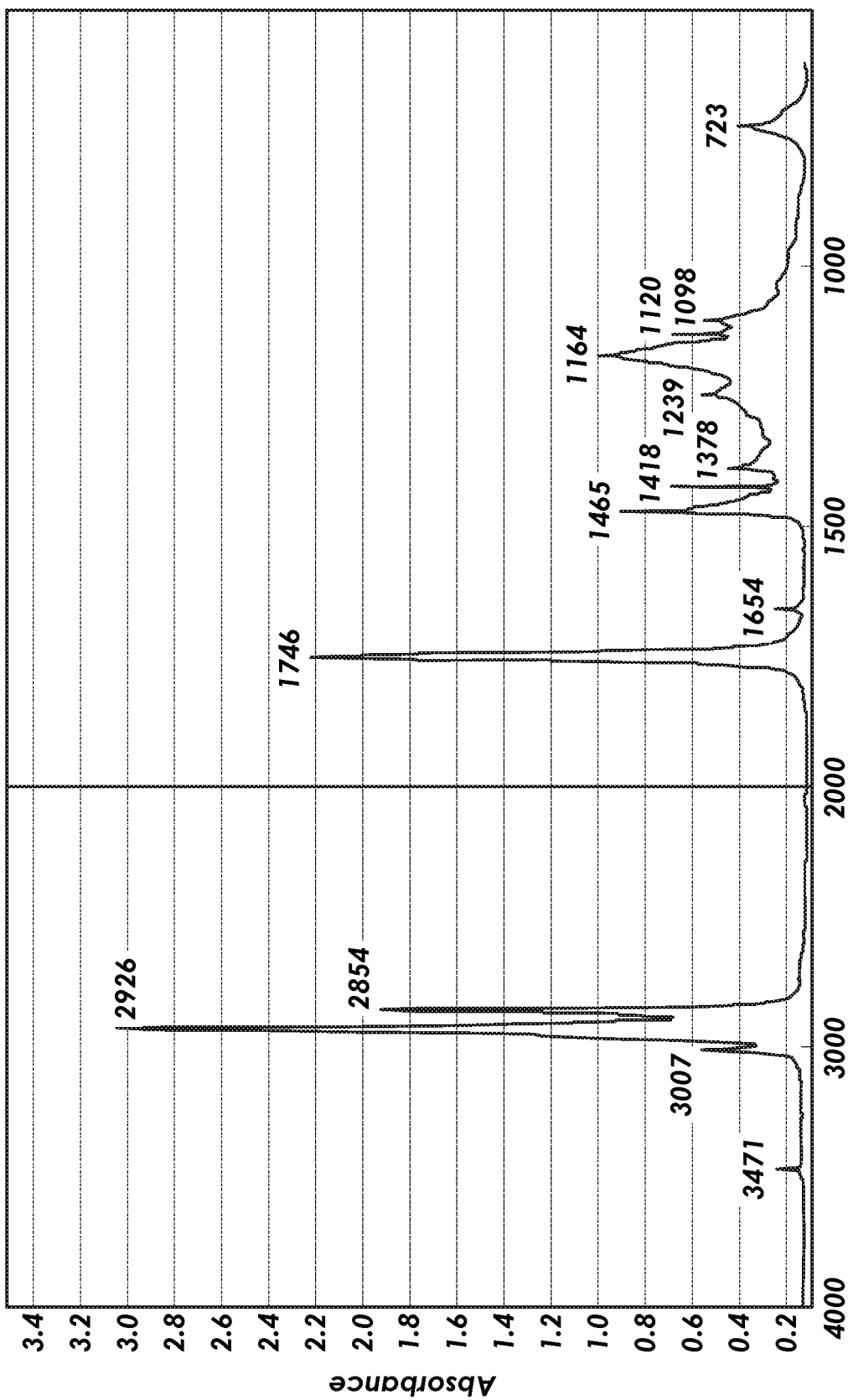
FIG. 3 depicts an infrared spectrum of canola oil.

FIG. 3 shows the infrared spectrum of the biofeedstock (canola oil) used in this example. The characteristic carbonyl group of the canola oil is show at approximately 1745 cm$^{-1}$. Canola oil contains oxygen in an amount of about 10.9 wt. %.

Figure 4:
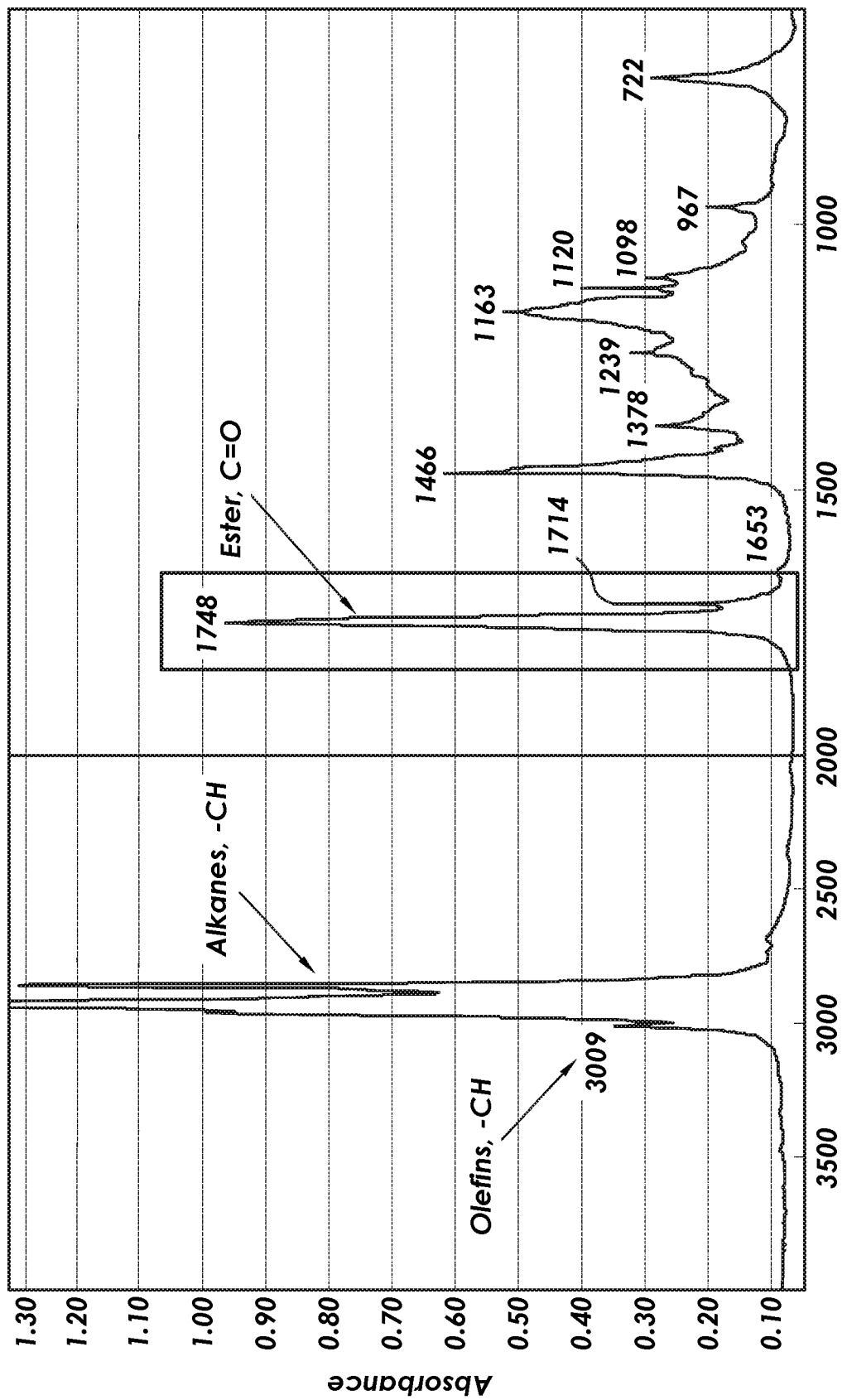
FIG. 4 depicts an infrared spectrum of an early-stage product from hydrotreatment in accordance with one or more embodiments.
Figure 5:
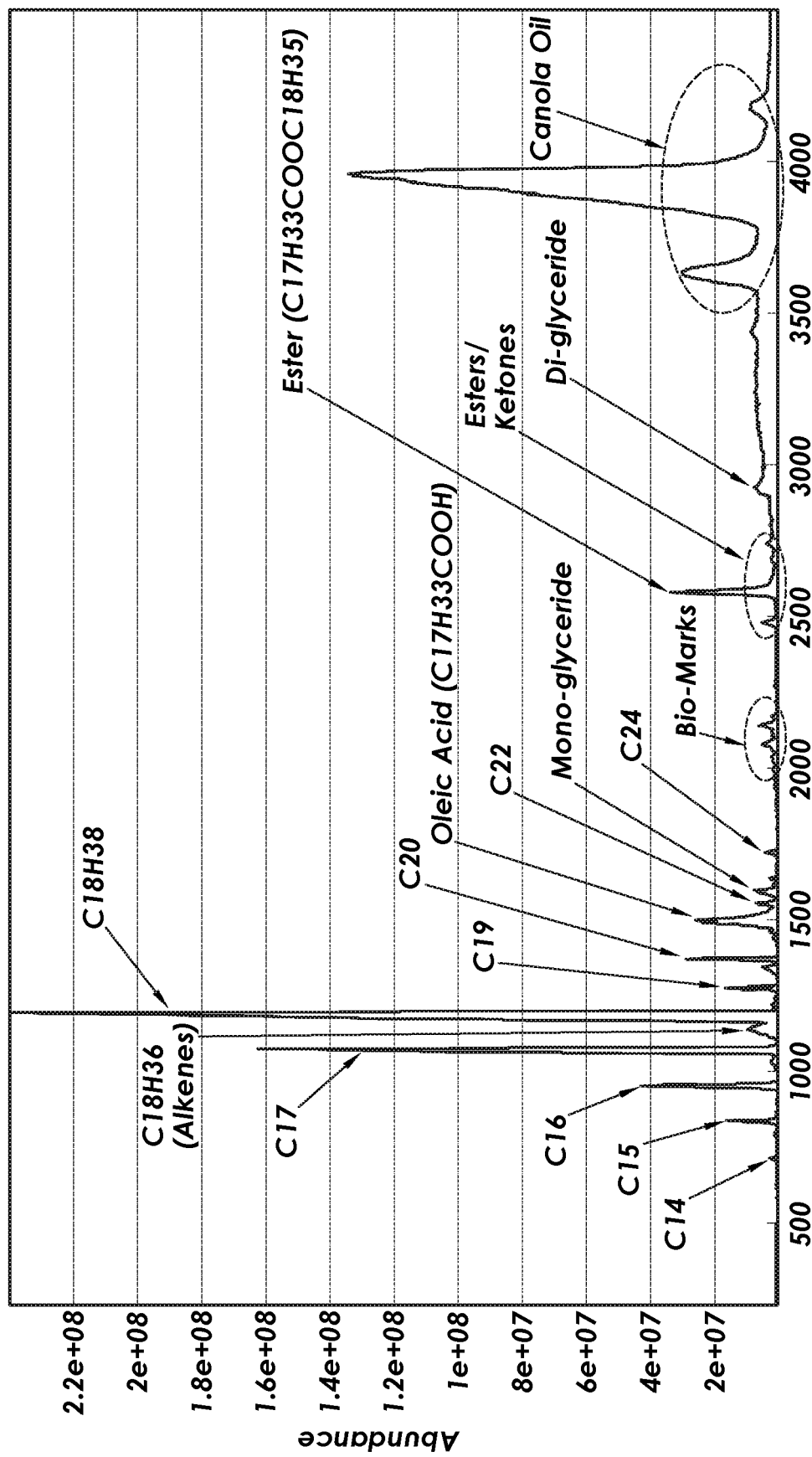
FIG. 5 depicts a gas chromatography-mass spectroscopy spectrum of an early-stage product from hydrotreatment in accordance with one or more embodiments.

FIG. 4 shows the infrared spectrum of an early-stage product of the hydrotreatment of the canola oil. At this early stage, the oxygen content was reduced from 10.9 wt. % to 6.6 wt. %. Since the early-stage product still contained a significant amount of oxygen, the infrared spectrum still showed a significant peak at approximately 1745 cm$^{-1}$. The GCMS data shown in FIG. 5 for the early-stage product confirms the existence of canola oil as well as esters, acids, and ketones in the early-stage product.

Figure 6:
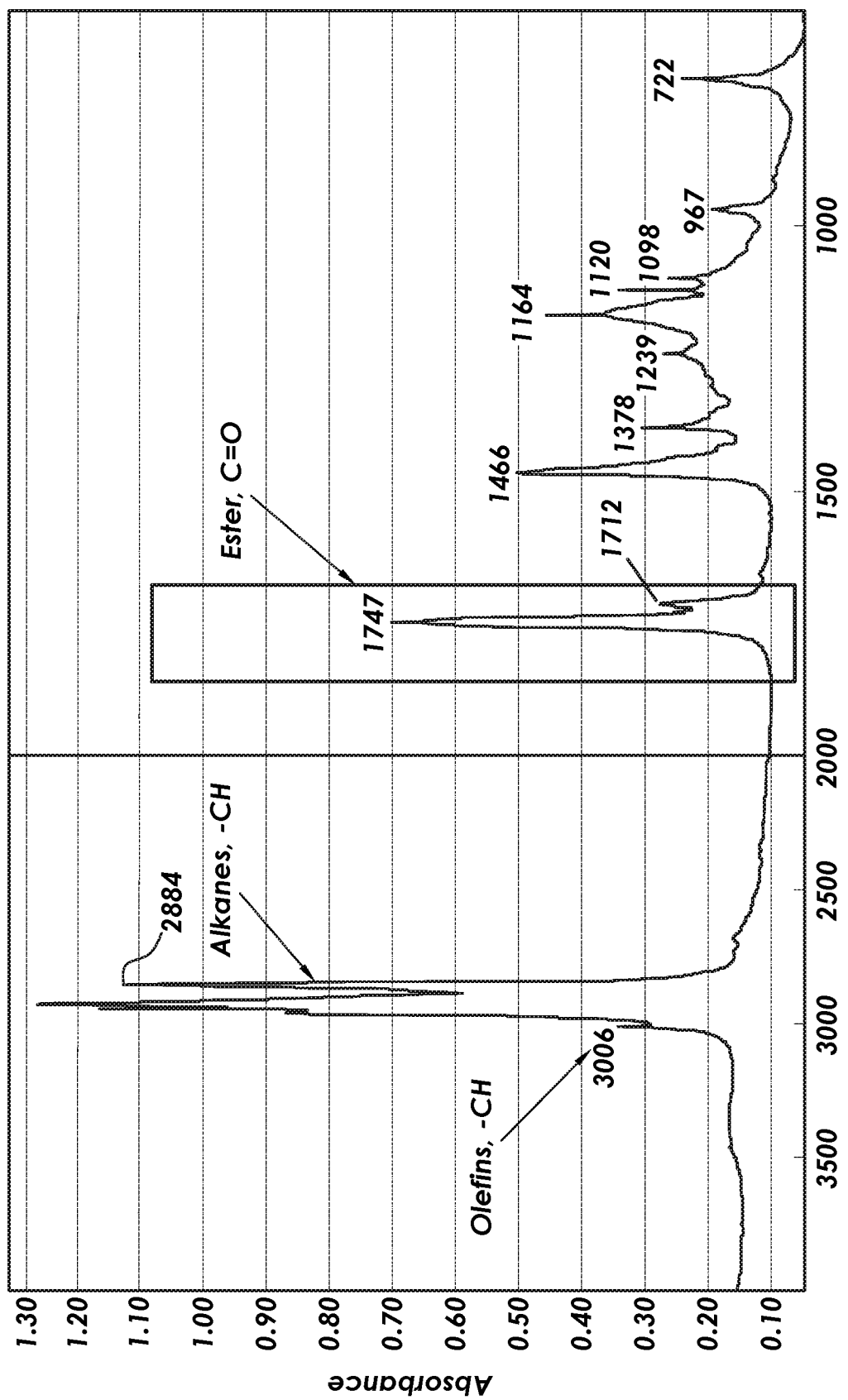
FIG. 6 depicts an infrared spectrum of a middle-stage product from hydrotreatment in accordance with one or more embodiments.
Figure 7:
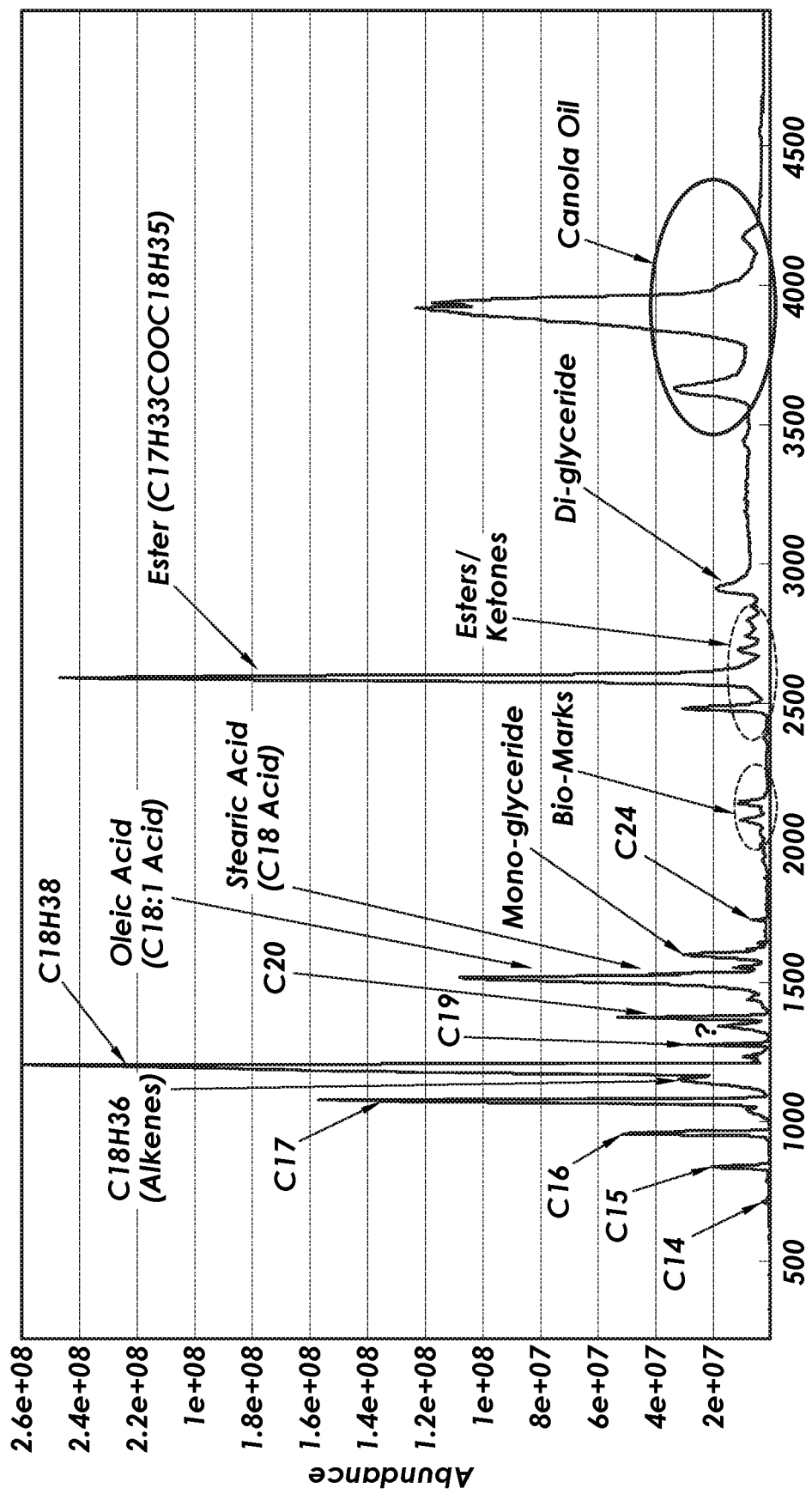
FIG. 7 depicts a gas chromatography-mass spectroscopy spectrum of a middle-stage product from hydrotreatment in accordance with one or more embodiments.

FIG. 6 shows the infrared spectrum of a middle-stage product of the hydrotreatment of the canola oil. At this middle stage, the oxygen content was further reduced to 5.8 wt. %. Since the oxygen content was reduced as compared to FIG. 3 for canola oil and FIG. 4 for the early-stage product, the peak at approximately 1745 cm$^{-1}$ was reduced. The GCMS data shown in FIG. 7 for the middle-stage product shows that the canola oil was reduced as compared to the GCMS data in FIG. 5 for the early-stage product.

Figure 8:
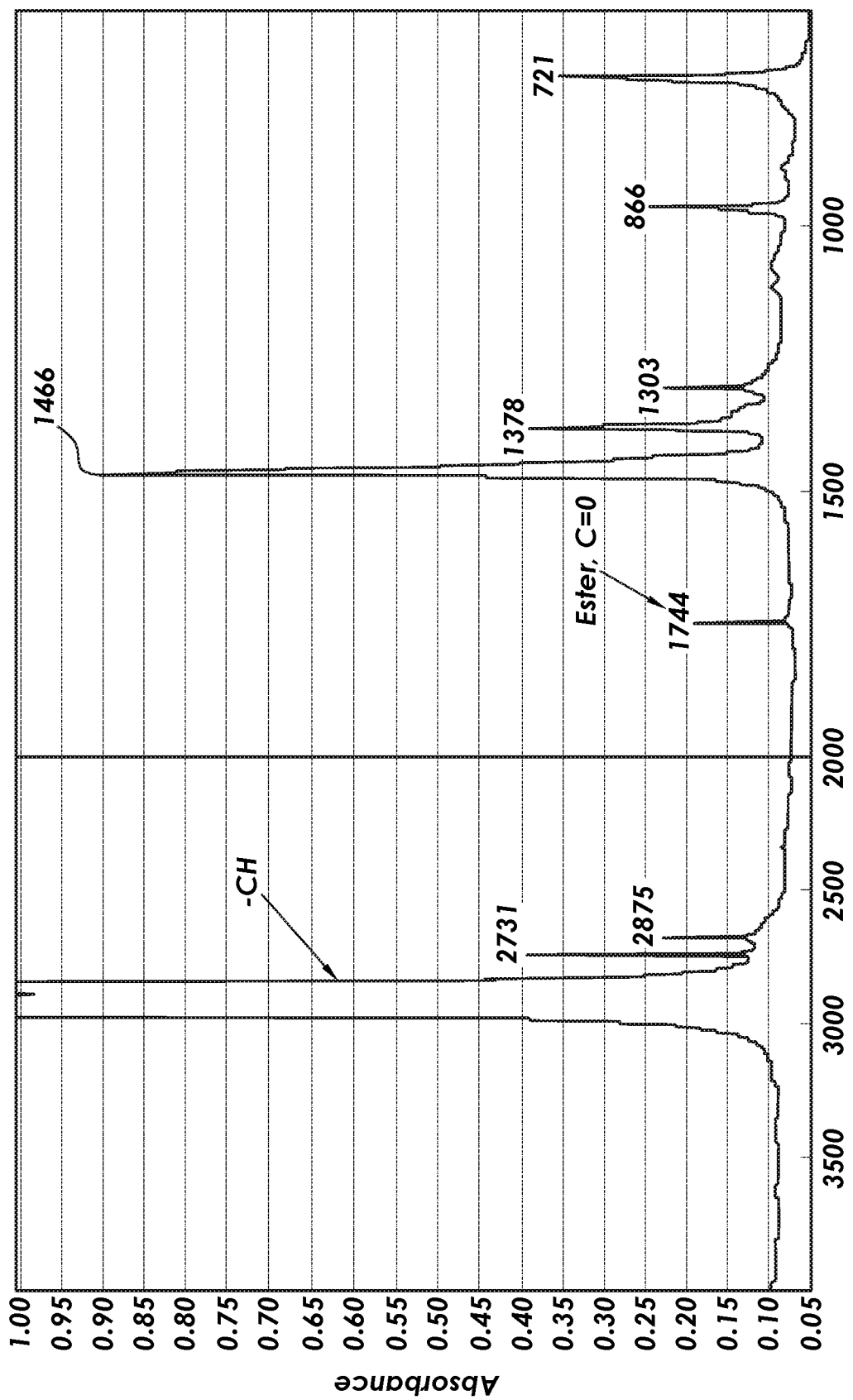
FIG. 8 depicts an infrared spectrum of a late-stage product from hydrotreatment in accordance with one or more embodiments.
Figure 9:
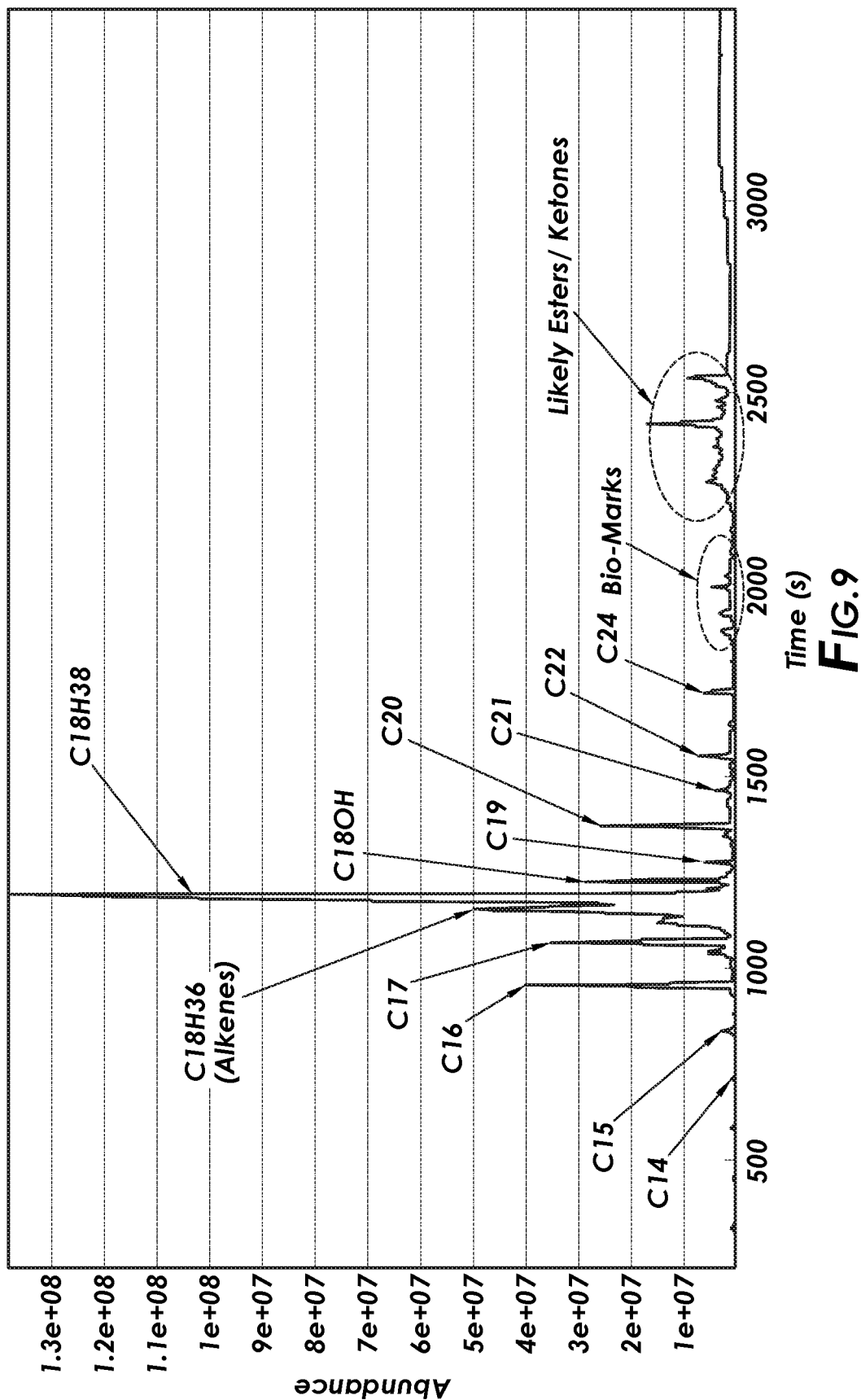
FIG. 9 depicts a gas chromatography-mass spectroscopy spectrum of a late-stage product from hydrotreatment in accordance with one or more embodiments.

FIG. 8 shows the infrared spectrum of a late-stage product of the hydrotreatment of the canola oil. At this late stage, the oxygen content was reduced to 0.34 wt. %. Since the oxygen content of the late-stage product was only 0.34 wt. %, the peak at approximately 1745 cm$^{-1}$ was very weak. The GCMS data shown in FIG. 9 for the late-stage product shows that the canola oil was fully converted, and only small amounts of esters and ketones were present in the late-stage product.

Figure 10:
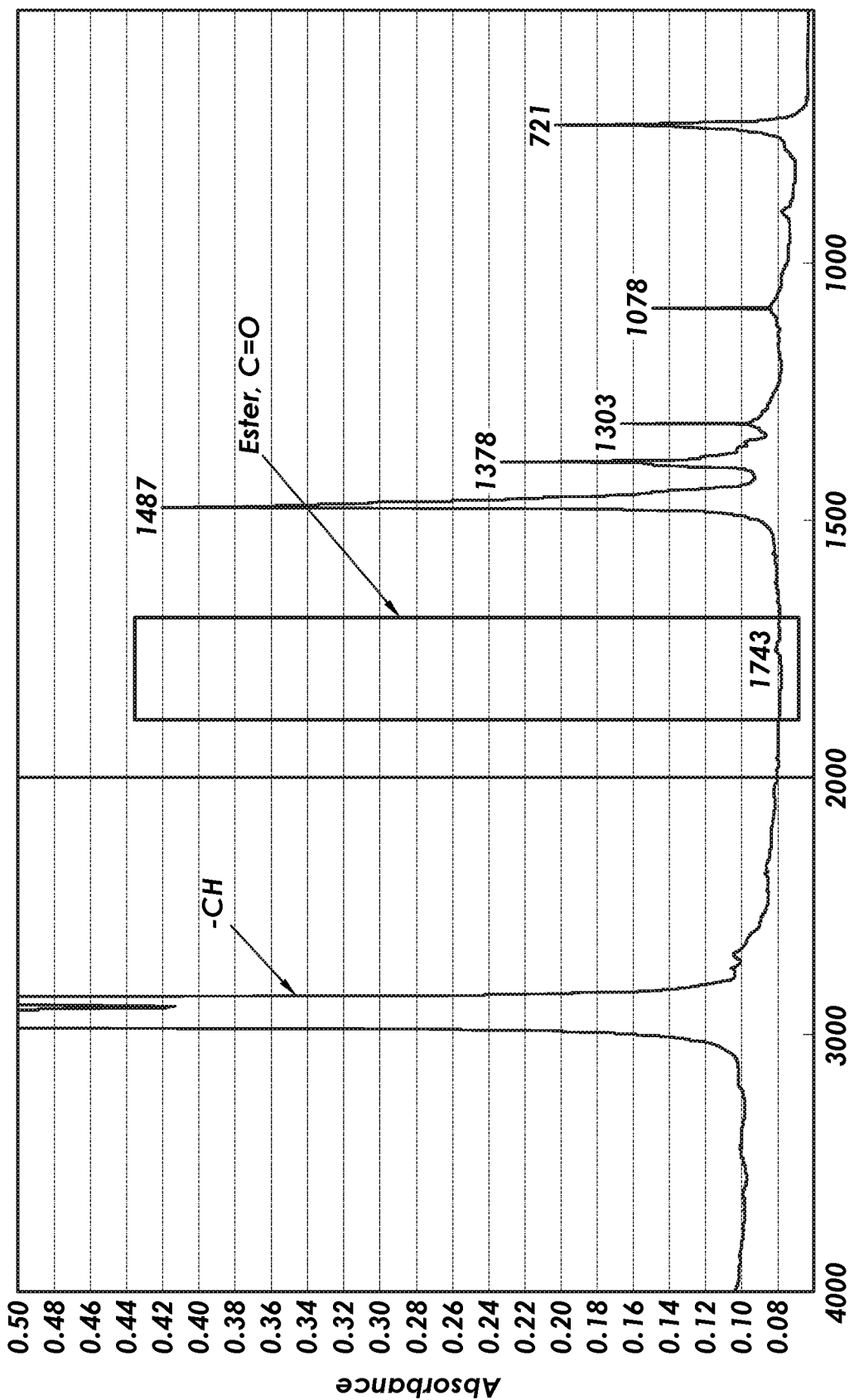
FIG. 10 depicts an infrared spectrum of a fully converted product from hydrotreatment in accordance with one or more embodiments.
Figure 11:
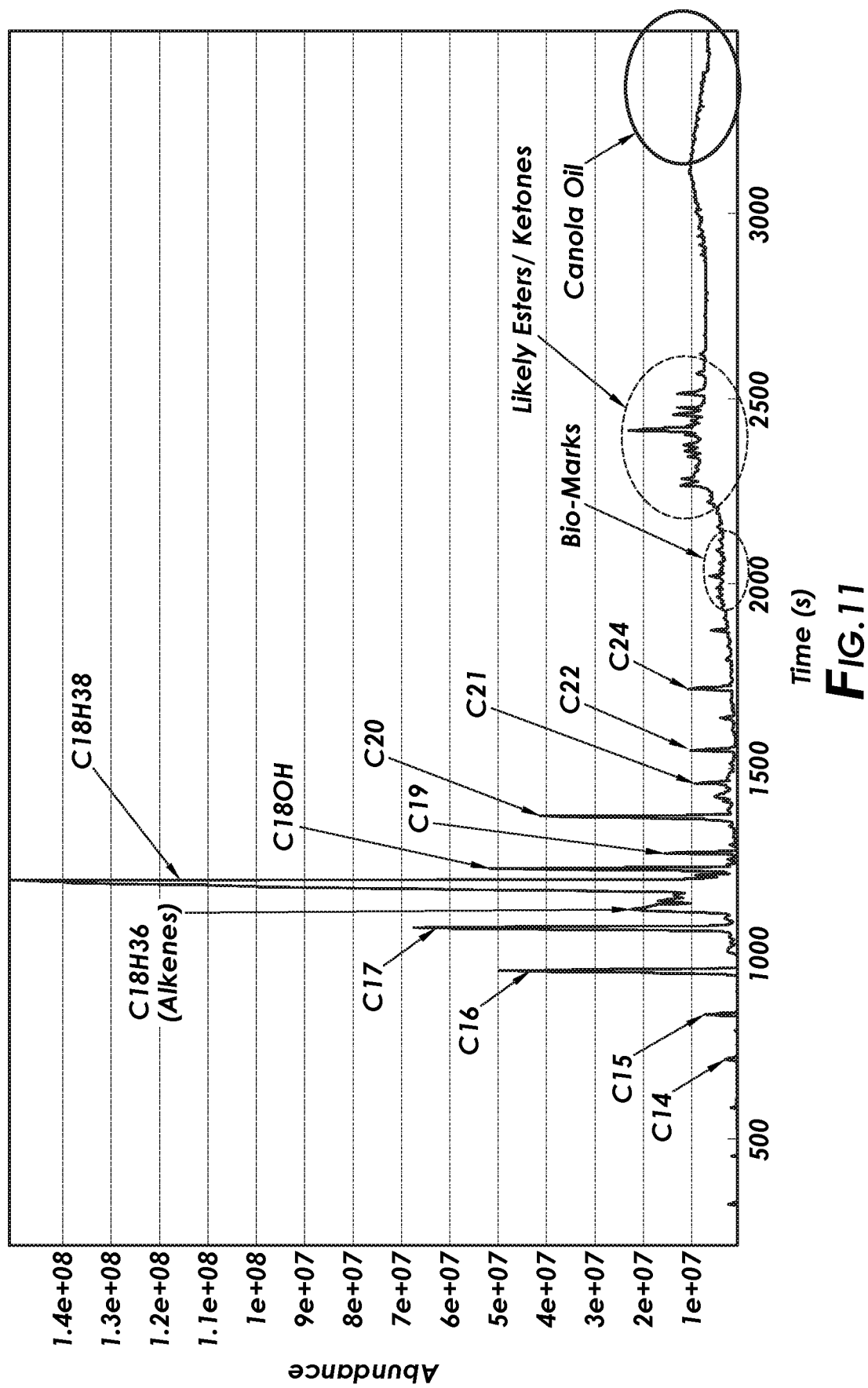
FIG. 11 depicts a gas chromatography-mass spectroscopy spectrum of a fully converted product from hydrotreatment in accordance with one or more embodiments.

FIG. 10 shows the infrared spectrum of a fully converted product of the hydrotreatment of the canola oil. At this stage, the oxygen content was reduced to less than 0.1 wt. %. Since the oxygen content in the product was below the detection limit, the peak at approximately 1745 cm$^{-1}$ was no longer detectable. The GCMS data shown in FIG. 11 for this product shows that the canola oil was fully converted. Intermediate products such as esters and ketones were further reduced in the product as compared to the GCMS data for other stage products.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

The phrase "major amount" or "major component" as it relates to components included within the renewable diesel of the specification and the claims means greater than or equal to 50 wt. %, or greater than or equal to 60 wt. %, or greater than or equal to 70 wt. %, or greater than or equal to 80 wt. %, or greater than or equal to 90 wt. % based on the total weight of the thermal management fluid. The phrase "minor amount" or "minor component" as it relates to components included within the renewable diesel of the specification and the claims means less than 50 wt. %, or less than or equal to 40 wt. %, or less than or equal to 30 wt. %, or greater than or equal to 20 wt. %, or less than or equal to 10 wt. %, or less than or equal to 5 wt. %, or less than or equal to 2 wt. %, or less than or equal to 1 wt. %, based on the total weight of the thermal management fluid. The phrase "substantially free" or "essentially free" as it relates to components included within the renewable diesel of the specification and the claims means that the particular component is at 0 weight % within the renewable diesel, or alternatively is at impurity type levels within the renewable diesel (less than 100 ppm, or less than 20 ppm, or less than 10 ppm, or less than 1 ppm).

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method of processing a biofeedstock, comprising:
hydrotreating the biofeedstock by reaction with hydrogen to form a hydrotreated biofeedstock;
monitoring conversion of the biofeedstock in the hydrotreating with an online analyzer; and
controlling recycle of the hydrotreated biofeedstock to the hydrotreating in response to the monitoring conversion of the biofeedstock.

2. The method of claim 1, wherein the biofeedstock comprises at one component selected from the group consisting of a vegetable oil, an animal fat, a fish oil, a pyrolysis oil, algae lipid, an algae oil, and combinations thereof.

3. The method of claim 1, wherein the biofeedstock comprises lipid compounds.

4. The method of claim 1, wherein the hydrotreated biofeedstock comprises paraffin products.

5. The method of claim 1, wherein the online analyzer comprises a spectrometer.

6. The method of claim 1, wherein the online analyzer is an infrared spectrometer, a near infrared spectrometer, or a Raman spectrometer.

7. The method of claim 1, wherein the monitoring conversion of the biofeedstock comprises determining oxygen removal from the biofeedstock.

8. The method of claim 1, wherein the monitoring conversion comprises correlating measurements from the online analyzer with conversion of the biofeedstock.

9. The method of claim 1, wherein the monitoring conversion comprises measuring carbonyl group concentration in the hydrotreated biofeedstock.

10. The method of claim 1, wherein the online analyzer is positioned between a hydrodeoxygenation reactor and a dewaxing reactor.

11. The method of claim 1, further comprising contacting at least a portion of the hydrotreated biofeedstock with a dewaxing catalyst to produce a renewable diesel product.

12. The method of claim 11, further comprising separating gas-phase products from the hydrotreated biofeedstock before the contacting at least the portion of the hydrotreated biofeedstock.

13. The method of claim 1, wherein the controlling recycle comprises recycling the hydrotreated biofeedstock to the hydrotreating until the monitoring conversion indicates that about 90 wt. % or more of oxygen is removed from the biofeedstock.

14. The method of claim 1, wherein the controlling recycle comprises recycling the hydrotreated biofeedstock to the hydrotreating until the monitoring conversion indicates that about 99 wt. % or more of oxygen is removed from the biofeedstock.

15. The method of claim 1, wherein the controlling recycle comprises recycling the hydrotreated biofeedstock until a peak intensity for a carbonyl peak on an infrared spectrum from the online analyzer is below a set intensity value.

16. A system for production of renewable diesel comprising:
a hydrotreatment stage comprising a hydrodeoxygenation reactor that receives a biofeedstock;
a dewaxing stage comprising a dewaxing reactor that receives a hydrotreated product stream from the hydrotreatment stage;
an online analyzer positioned to analyze the hydrotreated product stream to monitor conversion of the biofeedstock in the hydrotreatment stage; and
a controller that controls recycles of the hydrotreated product stream in response to measurements from the online analyzer.

17. The system of claim 16, wherein the online analyzer is an infrared spectrometer, a near infrared spectrometer, or a Raman spectrometer.

18. The system of claim 16, further comprising a recycle valve, wherein the controller is configured to send control signals to the recycle valve in response to the measurements from the online analyzer.

19. The system of claim 16, wherein the online analyzer is positioned between the hydrodeoxygenation reactor and the dewaxing reactor.

20. A method of processing a biofeedstock, comprising:
hydrotreating the biofeedstock in a hydrodeoxygenation reactor by reaction with hydrogen to form a hydrodeoxygenation reactor effluent stream comprising hydrotreated biofeedstock;
monitoring conversion of the biofeedstock in the hydrotreating with an online analyzer;
controlling recycle of the hydrotreated biofeedstock to the hydrodeoxygenation reactor in response to the monitored conversion of the biofeedstock, wherein the hydrotreated biofeedstock is recycled until a peak intensity for a carbonyl peak on an infrared spectrum from the online analyzer is below a set intensity value; and
contacting at least a portion of the hydrotreated biofeedstock with a dewaxing catalyst to isomerize paraffinic molecules in the hydrotreated biofeedstock.

* * * * *